US010647261B1

(12) United States Patent
Honer et al.

(10) Patent No.: US 10,647,261 B1
(45) Date of Patent: May 12, 2020

(54) TRAILER STEP ASSEMBLY (71) Applicants: Kurt Josef Honer, Angola, IN (US); William L. Gibson, Angola, IN (US)

(72) Inventors: Kurt Josef Honer, Angola, IN (US); William L. Gibson, Angola, IN (US)

(*) Notice: Subject to any disclaimer, the term of this patent is extended or adjusted under 35 U.S.C. 154(b) by 0 days.

(21) Appl. No.: 16/702,710

(22) Filed: Dec. 4, 2019

Related U.S. Application Data (63) Continuation of application No. 16/514,306, filed on Jul. 17, 2019, now Pat. No. 10,518,708, and a continuation of application No. 16/266,362, filed on Feb. 4, 2019, now Pat. No. 10,525,891.

(51) Int. Cl.
B60R 3/02 (2006.01)

(52) U.S. Cl.
CPC .................................. B60R 3/02 (2013.01)

(58) Field of Classification Search
CPC ............... B60R 16/0238; B60R 16/02; B60R 2300/105; B60R 3/02; B60R 3/002
See application file for complete search history.

(56) References Cited

U.S. PATENT DOCUMENTS

| 3,515,406 | A | | 6/1970 | Endsley, Jr. | |
|---|---|---|---|---|---|
| 3,796,456 | A | * | 3/1974 | Bergeson | B60R 3/02 296/156 |
| 4,139,078 | A | * | 2/1979 | Keller | E06C 5/02 182/209 |
| 4,264,084 | A | | 4/1981 | Telles | |
| 4,347,638 | A | * | 9/1982 | Weaver | B60R 3/02 14/71.1 |
| 4,720,116 | A | | 1/1988 | Williams | |
| 4,846,304 | A | * | 7/1989 | Rasmussen | A47B 77/10 182/88 |
| 5,193,878 | A | * | 3/1993 | Weaver | B60P 3/32 296/162 |
| 5,228,707 | A | | 7/1993 | Yoder | |
| 5,660,405 | A | * | 8/1997 | Campbell | B60R 3/02 182/88 |
| 6,869,092 | B1 | * | 3/2005 | Henn | B60R 3/02 280/166 |
| 7,281,745 | B1 | * | 10/2007 | Meinke | B60P 3/40 296/26.08 |
| 2014/0167379 | A1 | * | 6/2014 | Kibler | E06C 5/06 280/166 |

OTHER PUBLICATIONS

U.S. Appl. No. 16/514,306, filed Jul. 17, 2019.
U.S. Appl. No. 16/266,362, filed Feb. 4, 2019.
Lippert Components Solid Step Manual; 680078-SSWLAAM; 8/17-REV3; lippertcomponents.com (2017).

* cited by examiner

Primary Examiner — John D Walters
Assistant Examiner — James J Triggs
(74) Attorney, Agent, or Firm — Barnes & Thornburg LLP (57) ABSTRACT

A trailer, retractable stair assembly, and method of operating same is provided. The trailer includes a frame that defines an interior cavity. A retractable stair assembly is movable between a stowed position in which the retractable stair assembly is positioned within the interior cavity and a deployed position in which the retractable stair assembly extends out of the trailer frame to establish a plurality of steps out of the trailer to an egress surface.

20 Claims, 10 Drawing Sheets

TRAILER STEP ASSEMBLY

RELATED APPLICATIONS

This is a continuation application of U.S. patent application Ser. No. 16/514,306 filed Jul. 17, 2019, for a "Trailer Step Assembly" (now U.S. Pat. No. 10,518,708) and U.S. patent application Ser. No. 16/266,362 filed Feb. 4, 2019, for a "Trailer Step Assembly" (now U.S. Pat. No. 10,525,891), which are both hereby incorporated by reference in their entireties.

TECHNICAL FIELD

This disclosure relates generally to trailers; in particular, this disclosure relates to a retractable stair assembly for a trailer.

BACKGROUND

Trailers, motor homes, and like vehicles have become very popular. These types of vehicles have a floor level elevated at a considerable distance above ground level. This makes stairs or some other transitional surface necessary.

There is a variety of existing stair designs for these types of vehicles. Some stairs have fixed steps and are deployed by placing the stairs adjacent to the vehicle when it is parked; however, these fixed stairs must be placed into a storage space when the vehicle is traveling. Others stair assemblies are retractable. Retractable stairs can be extended to a deployed position that provides a transitional surface out of the vehicle and then retracted out of way when not in use.

Figure 1:
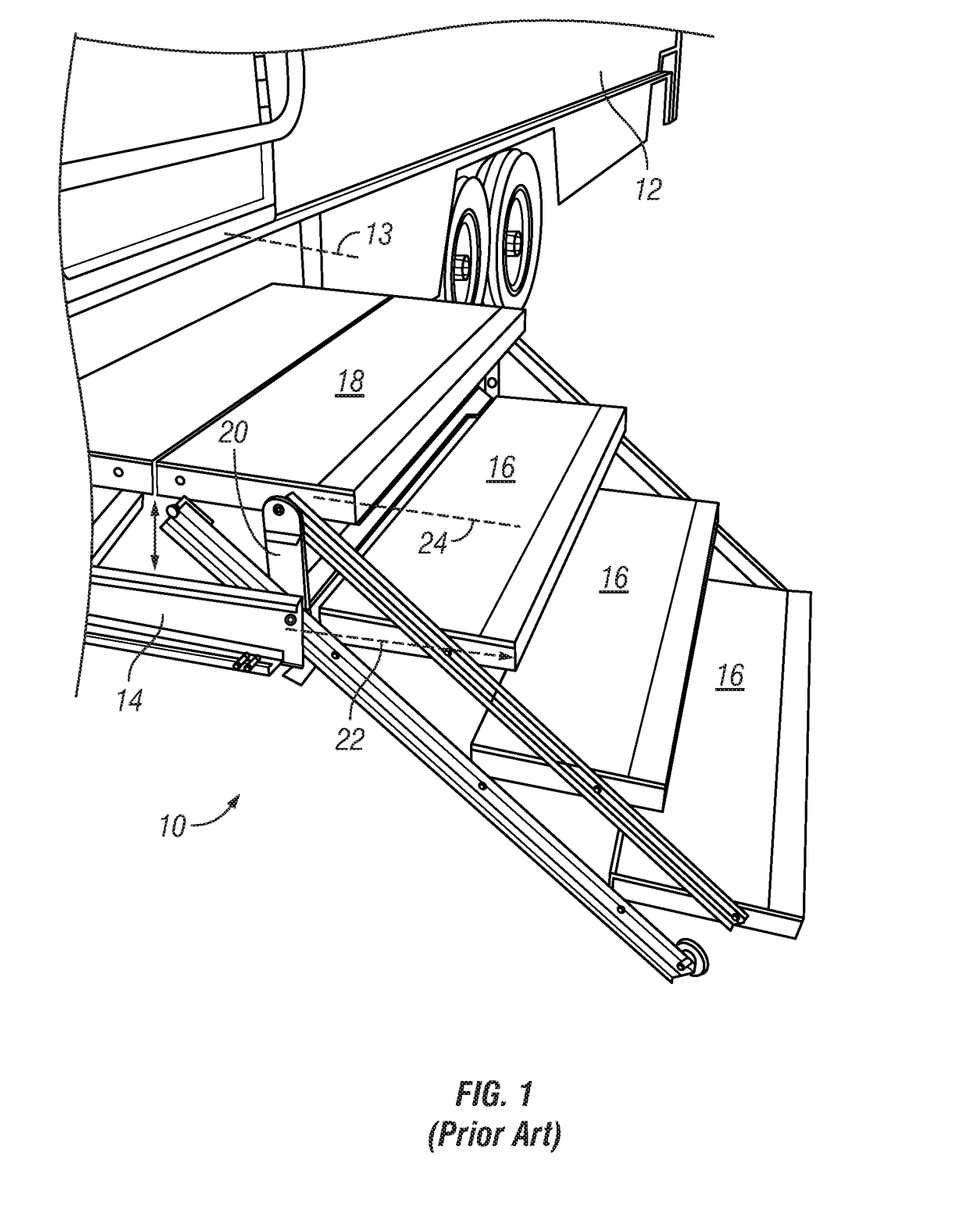
FIG. 1 is left side, perspective view of a prior art retractable trailer stair assembly in a deployed position.
Figure 2:
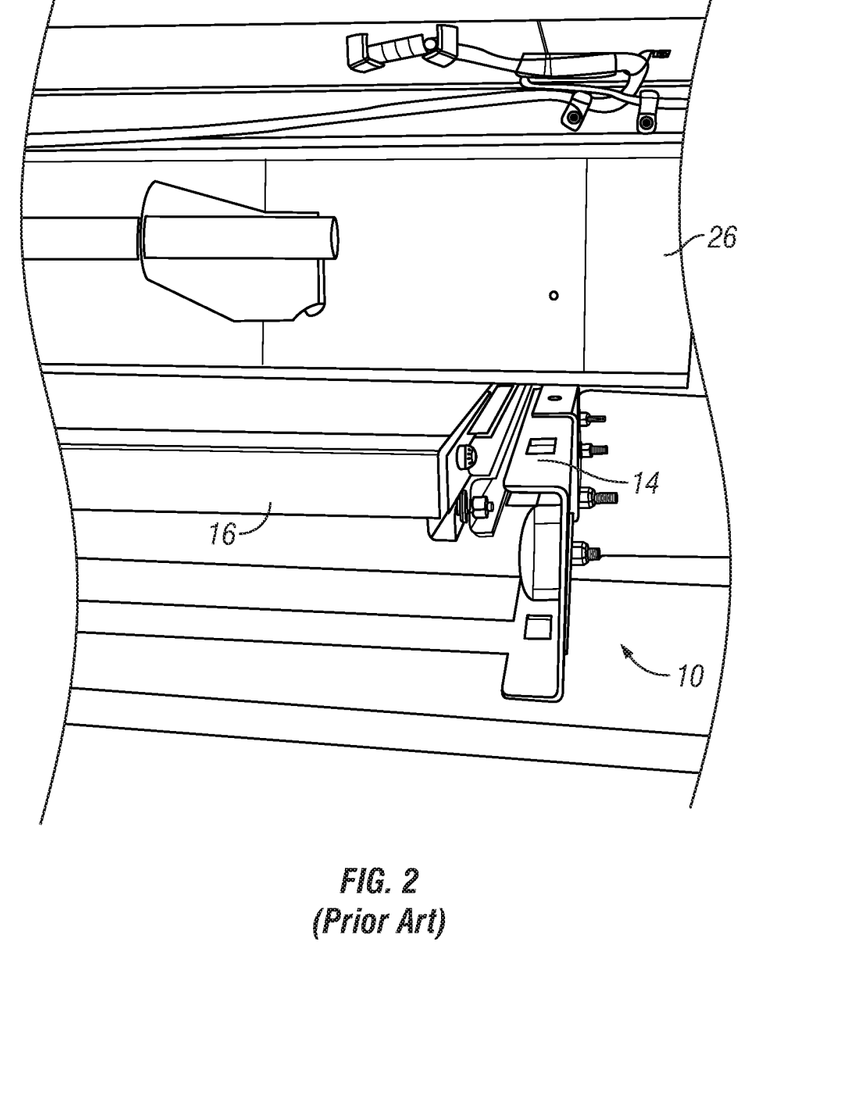
FIG. 2 is a front perspective view of the prior art retractable trailer stair assembly shown in FIG. 1 in a stowed position.

FIGS. 1 and 2 illustrate an existing retractable stair assembly 10 for a trailer 12. The retractable stair assembly 10 is movable between a deployed position (FIG. 1) and a stowed position (FIG. 2). As is typical, the retractable stair assembly 10 is installed underneath the trailer 12. Unfortunately, in this position, the retractable stair assembly 10 is exposed to the elements, such as rain, snow, road salt and/or dirt. Additionally, the retractable stair assembly 10 is vulnerable to being damaged, such as due to lack of clearance underneath the trailer 12 on a steep slope or rocks kicking up underneath the trailer 12 as it travels.

When the retractable stair assembly 10 is deployed, there is a slide assembly 14 that moves the steps 16 and step platform 18 (the first step down from the floor level of the trailer) out from its stowed position underneath the trailer 12. The floor level of the trailer 12 is represented by line 13.

Since the retractable stair assembly 10 is stowed underneath the trailer 12, the retractable stair assembly 10 includes a lift mechanism 20 to elevate the step platform 18 as the retractable stair assembly 10 is being deployed. When in the stowed position, the step platform 18 collapses downward to align with the slide assembly 14 underneath the trailer 12; however, when the step platform 18 is deployed, it elevates via the lift mechanism 20. Without this lift mechanism 20, the step platform 18 would be positioned too low from the floor level 13 and would be a potentially dangerous transition.

The step platform's 18 elevated height in the deployed position (FIG. 1) compared to the collapsed position (FIG. 2) is illustrated by comparing the longitudinal axis of the slide assembly 14 (defined by line 22) with the longitudinal axis of the step platform 18 (defined by line 24) in the deployed position. The lift mechanism 20 and elevation of the step platform 18 during deployment increases complexity and manufacturing cost of the retractable stair assembly 10. Moreover, this design necessitates a fixed length of the step platform 18 that cannot be adjusted.

As seen in FIG. 2, the retractable stair assembly 10 is underneath the trailer frame structure 26. As discussed above, this placement of the retractable stair assembly 10 has several downsides, including exposure to the elements and vulnerability to being damaged. Additionally, as discussed, this position underneath the trailer requires the lift mechanism 20 to elevate the step platform 18 during deployment so the first step out of the trailer 12 is not down too far, which would be potentially dangerous.

Therefore, a need exists that overcomes one or more of the disadvantages of present retractable stair assemblies.

SUMMARY

According to one aspect, this disclosure provides a trailer with a retractable stair assembly. The trailer includes a trailer frame with a frame platform and at least one structural beam extending from the frame platform. The frame platform and the structural beam define an interior cavity. The trailer also includes a retractable stair assembly movable between a stowed position in which the retractable stair assembly is positioned within the interior cavity of the trailer frame and a deployed position in which the retractable stair assembly extends out of the trailer frame to establish a plurality of steps out of the trailer to an egress surface.

According to another aspect, this disclosure provides a retractable stair assembly for a trailer having an interior cavity defined by a trailer frame. The retractable stair assembly includes a slide assembly, a platform, and a plurality of steps. The platform is connected with the slide assembly such that the platform is slidably movable between a stowed position and a deployed position. The plurality of steps are operatively connected with the platform. The platform moves between the stowed position and the deployed position along a single plane.

According to a further aspect, this disclosure provides a method of moving a retractable trailer stair assembly between a stowed position and a deployed position. The method includes the steps of: (i) providing a retractable stair assembly in a stowed position in which the retractable stair assembly is disposed within an interior cavity of a trailer frame; (ii) moving the retractable stair assembly from the stowed position to a deployed position extending out of the trailer frame, wherein the retractable stair assembly includes a platform and a plurality of steps configured to define a set of steps out of a trailer to an egress surface in the deployed position. In some embodiments, the platform is linearly movable between the stowed position and the deployed position.

BRIEF DESCRIPTION OF THE DRAWINGS

The present disclosure will be described hereafter with reference to the attached drawings which are given as non-limiting examples only, in which.

Corresponding reference characters indicate corresponding parts throughout the several views. The components in the figures are not necessarily to scale, emphasis instead being placed upon illustrating the principals of the invention. The exemplification set out herein illustrates embodiments of the invention, and such exemplification is not to be construed as limiting the scope of the invention in any manner.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

This disclosure relates to a retractable stair assembly for a trailer, motor home or like vehicle. Unlike existing retractable stair assemblies that are installed underneath the trailer, embodiments of this disclosure provide a retractable stair assembly that is installed within an interior cavity in the trailer frame. In this position, the retractable stair assembly is protected from weather elements outside the trailer when it is stowed. In some embodiments, the retractable stair assembly is installed in a position in which the step platform can move between its stowed and deployed positions linearly along the same plane as the slide assembly without needing a lift mechanism to elevate the step platform towards the floor level of the trailer. Instead, the step platform could be substantially at floor level in the deployed position without being elevated. This allows the length of the step platform to be adjusted based on how far the step assembly is extended. Additionally, the retractable stair assembly does not reduce clearance underneath the trailer similar to existing stair assemblies that are installed underneath the trailer.

Figure 3:
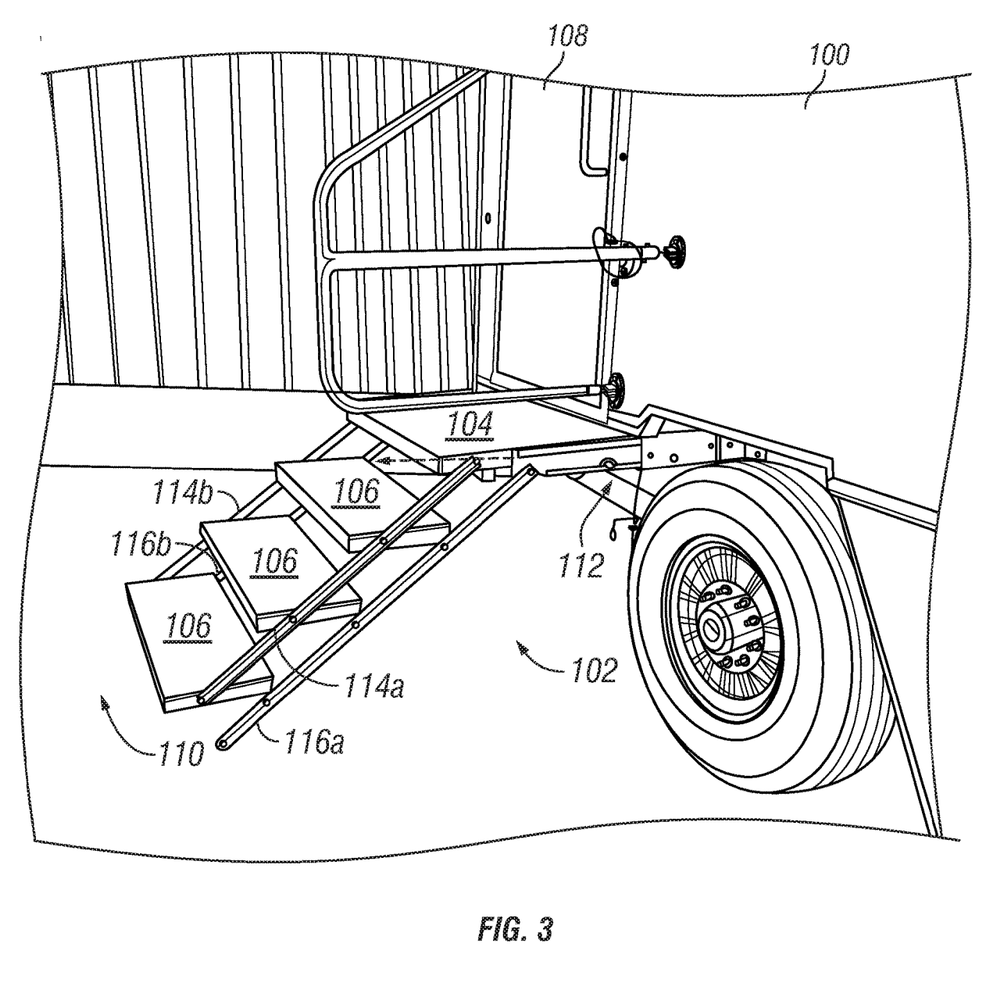
FIG. 3 is a right side, perspective view of an example retractable trailer stair assembly in a deployed position according to an embodiment of the present disclosure.

FIG. 3 illustrates a trailer 100 with an example embodiment of a retractable stair assembly 102 in a deployed position according to an embodiment of this disclosure. In the embodiment shown, the retractable stair assembly 102 includes a step platform 104 and a plurality of steps 106 transitioning between a floor level of the trailer 100 out a door 108 and an egress surface 110, such as the ground. A slide assembly 112 is configured to move the retractable stair assembly 102 between the deployed position and stowed position. In the stowed position, the retractable stair assembly 102 is positioned within a cavity defined in the trailer frame (FIG. 5). As shown, the top of the step platform 104 is substantially at floor level of the trailer in the deployed position even though the step platform 104 is substantially coplanar with the slide assembly. No elevation of the step platform 104 is necessary because the retractable stair assembly 102 is installed at a higher elevation within the trailer frame. In the example shown, first guide brackets 114a, 114b and second guide brackets 116a, 116b are pivotally connected to the step platform 104 and the plurality of steps 106. This allows the plurality of steps 106 to pivot between a deployed position in which the steps define a stairway and a position in which the longitudinal axis of the plurality of steps are axially aligned with the longitudinal axis of the step platform 104 (FIG. 4C) to be moved into a stowed position.

Figure 4A:
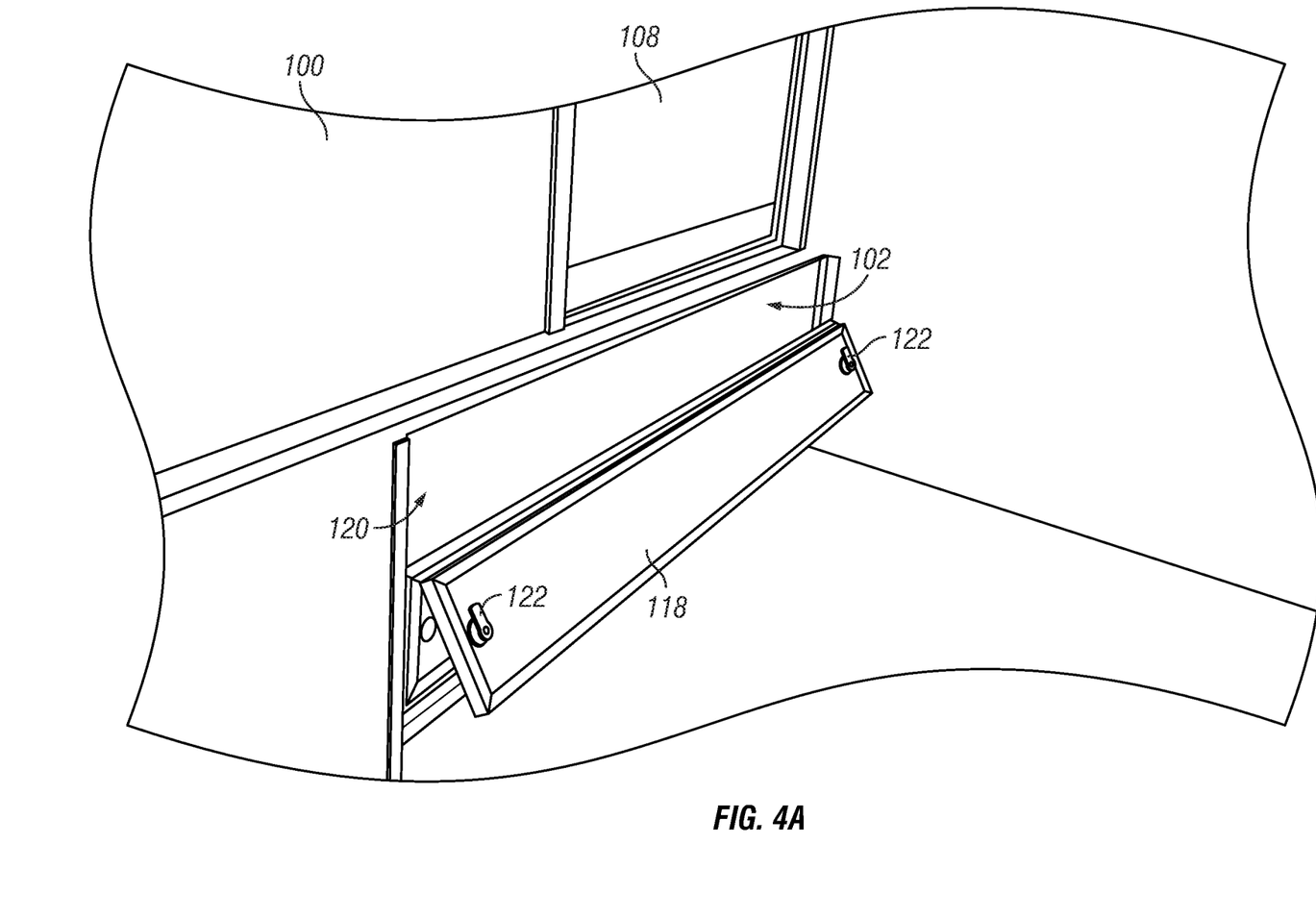
FIGS. 4A-4D are a series of progression views showing left side, perspective views of the example retractable trailer stair assembly shown in FIG. 3 moving from a stowed position to a deployed position.

FIGS. 4A-4D show a progression of the retractable stair assembly 102 from a stowed position (FIG. 4A) in which the retractable stair assembly 102 is disposed within a cavity in the trailer frame to a deployed position (FIG. 4D) in which the step platform 104 and the plurality of steps 106 form a stairway. Referring to FIG. 4A, the retractable stair assembly 102 is in a stowed position. The retractable stair assembly 102 is disposed in an internal cavity within the trailer's frame 126 (FIG. 5). As shown, there is a door 118 that moves between a closed position and an open position. The door 118 helps protect the retractable stair assembly 102 from the elements when in the closed position. In the open position, as shown, the retractable stair assembly 102 can be extended to the deployed position through an opening 120. In some embodiments, the door 118 may include one or more locks 122 to secure the door 118.

Figure 4B:
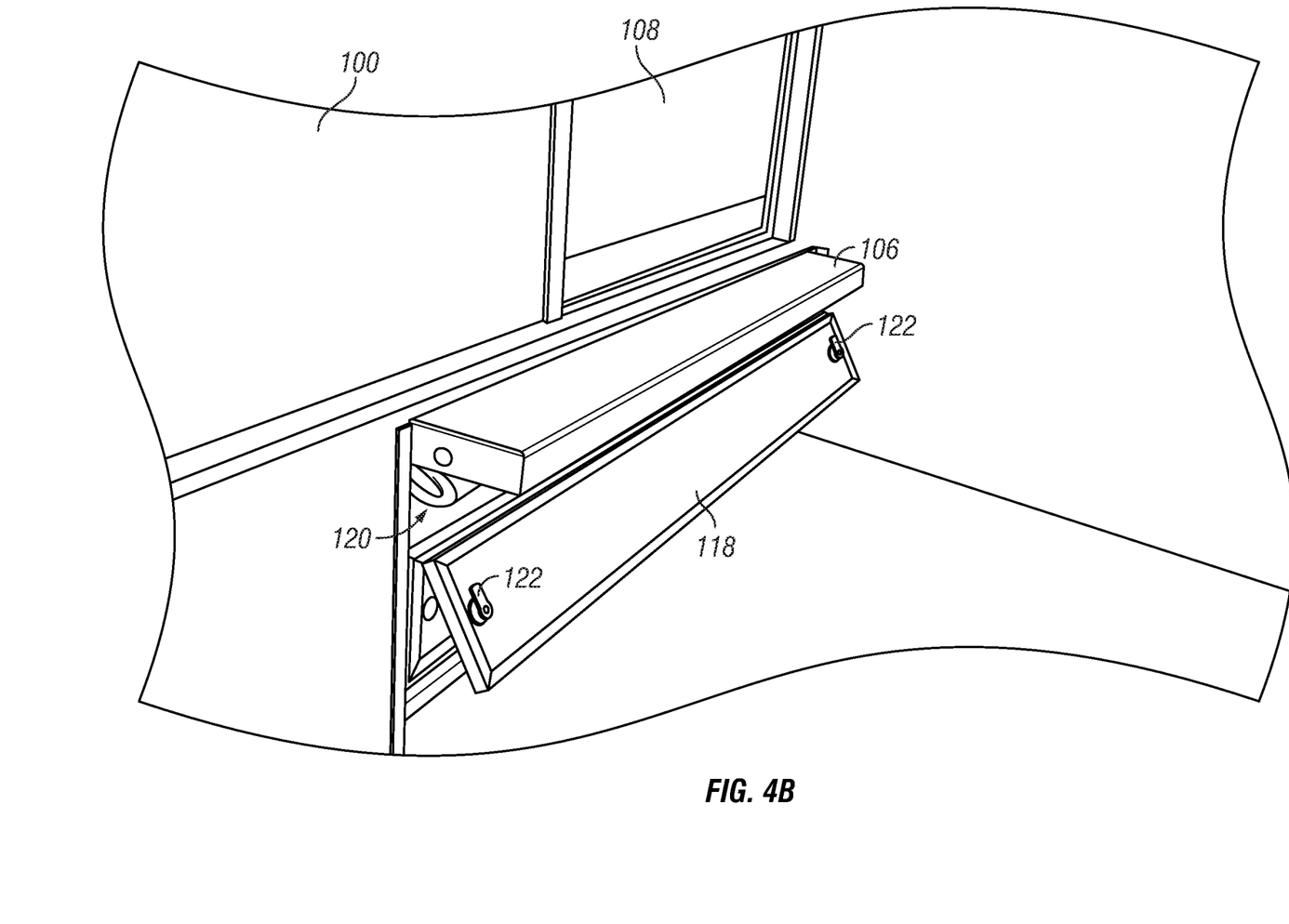

To move the retractable stair assembly 102 from the stowed to deployed positions, the retractable stair assembly 102 is initially pulled out of the opening 120. FIG. 4B shows the retractable stair assembly 102 as it is initially pulled out of the opening 120. The retractable stair assembly 102 is slidably movable out of the opening 120 via the slide assembly 112. Accordingly, a user would grasp the distal end of the bottom step 106 and pull to start sliding the retractable stair assembly 102 out of the opening 120.

Figure 4C:
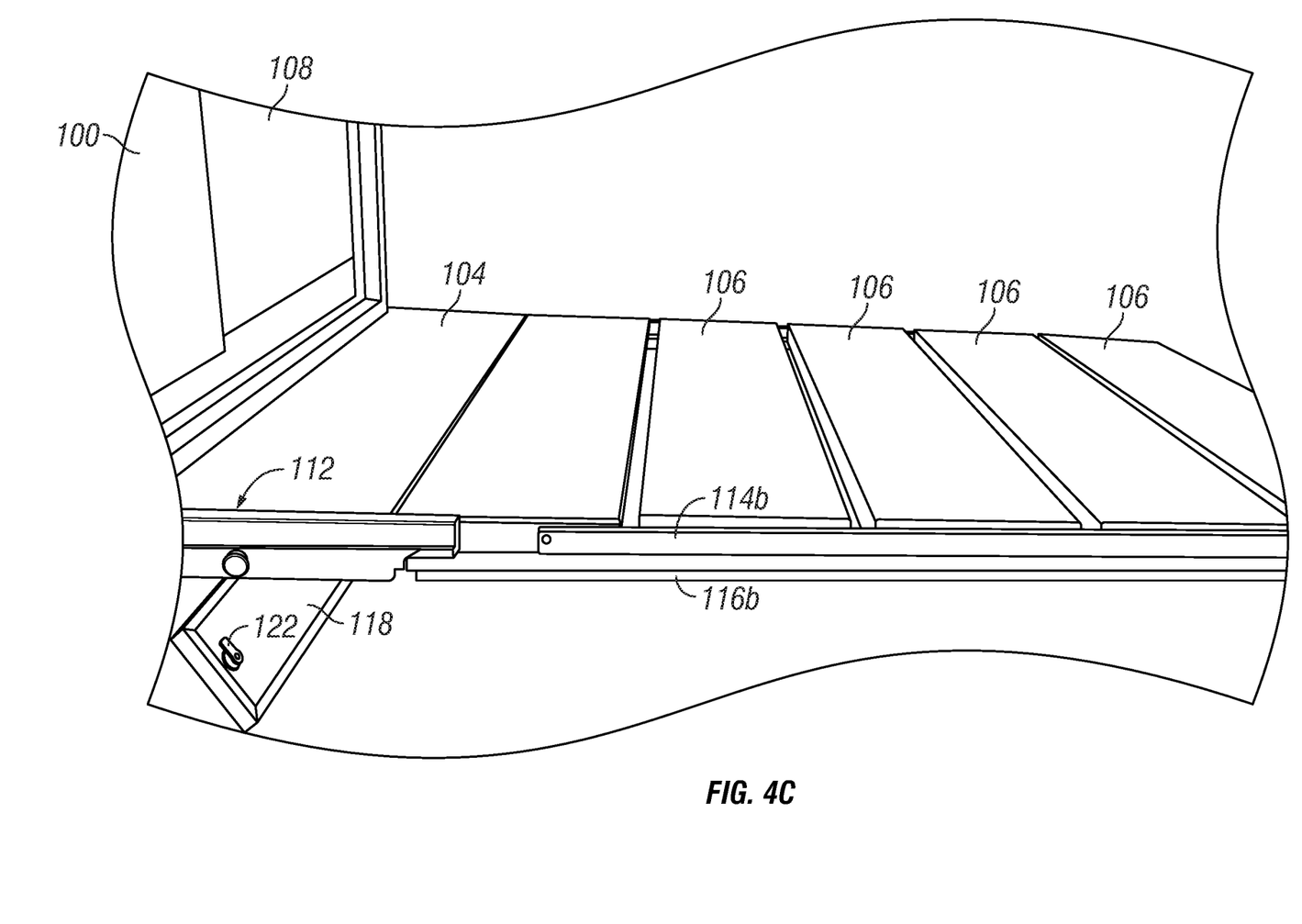
Figure 4D:
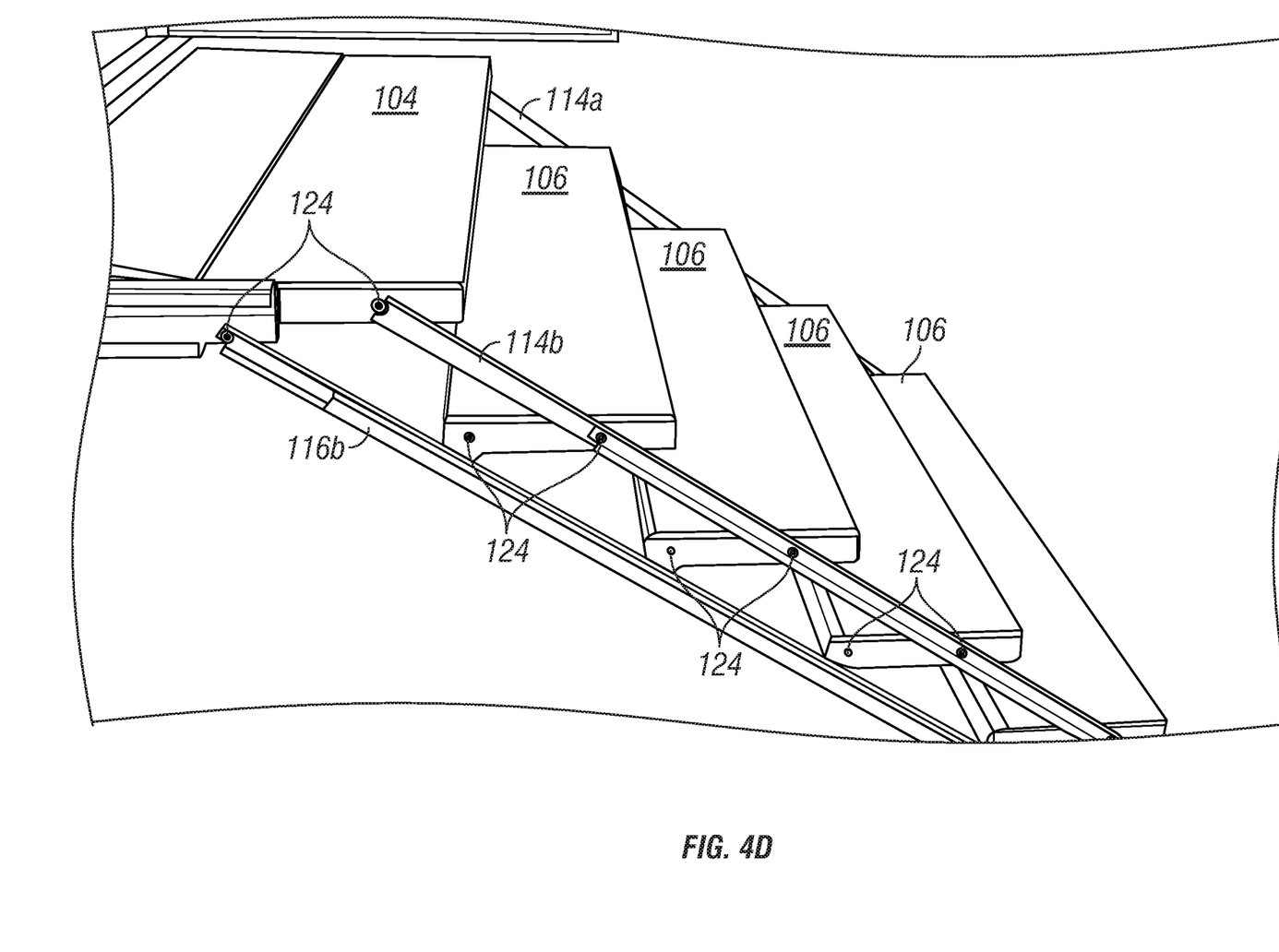
Figure 5:
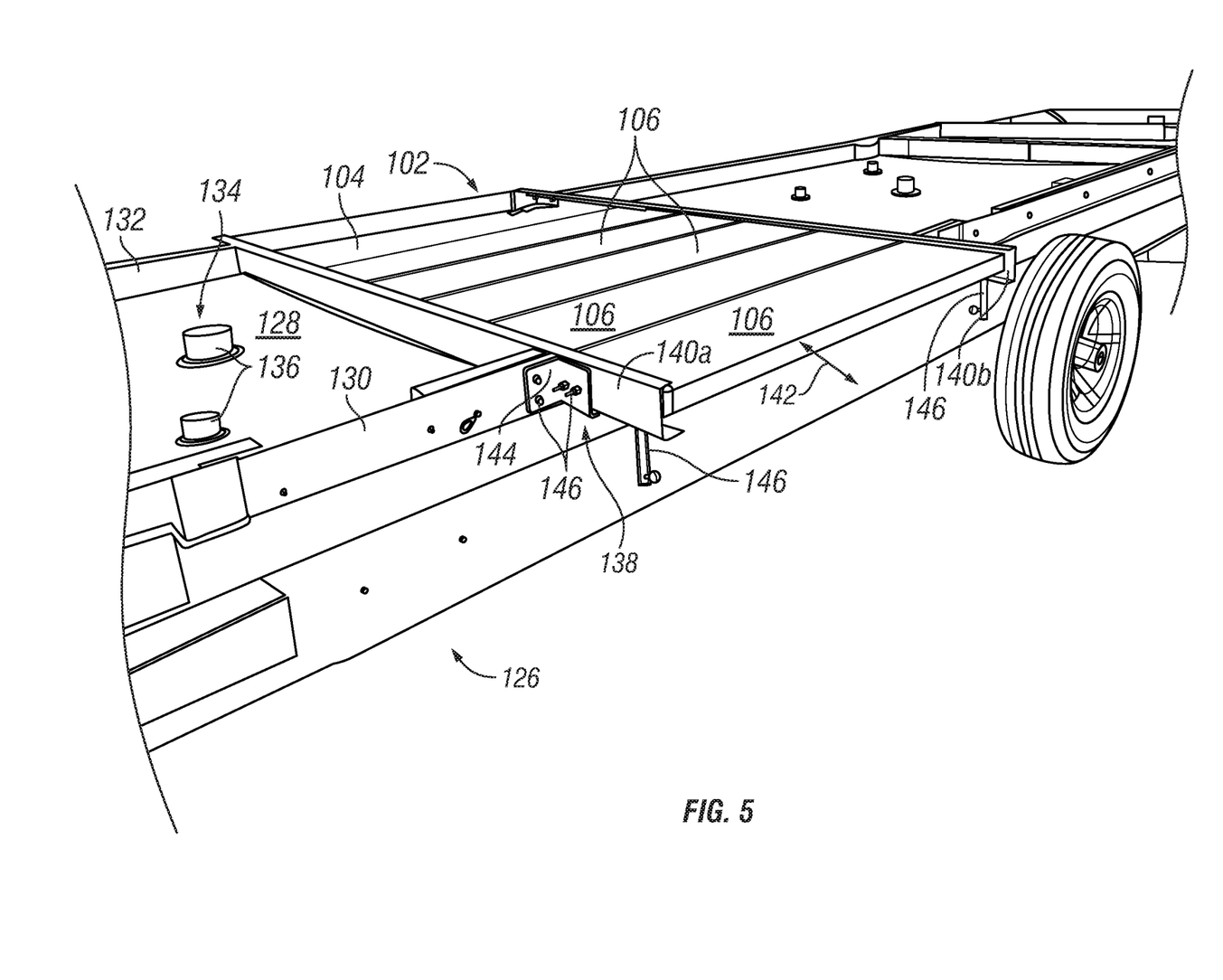
FIG. 5 is a left side, perspective view of the example retractable trailer stair assembly installed in a trailer frame without the trailer body.

FIG. 4C shows the retractable stair assembly 102 after continuing to slide out of the opening 120. As shown, the step platform 104 and the plurality of steps 106 are axially aligned. The retractable stair assembly 102 will continue to slide out of the opening until the slide assembly 112 is fully extended. At that point, the retractable stair assembly 102 cannot extend any further out of the opening 120 and can be lowered to the ground. As the retractable stair assembly 102 is lowered, the first guide bracket 114a, 114b and the second guide bracket 116a, 116b will separate by gravity force so the steps 106 form into a stairway in a deployed position as shown in FIG. 4D. As shown, the first guide bracket 114a, 114b and second guide bracket 116a, 116b are pivotally connected to each step. The pivotal connection points 124 of the first guide bracket 114a, 114b and second guide bracket 116a, 116b to each step 106 are spaced apart to move the steps 106 into a stairway in the deployed position while also providing structural rigidity to help support the weight of persons using the retractable stair assembly 102.

Figure 6:
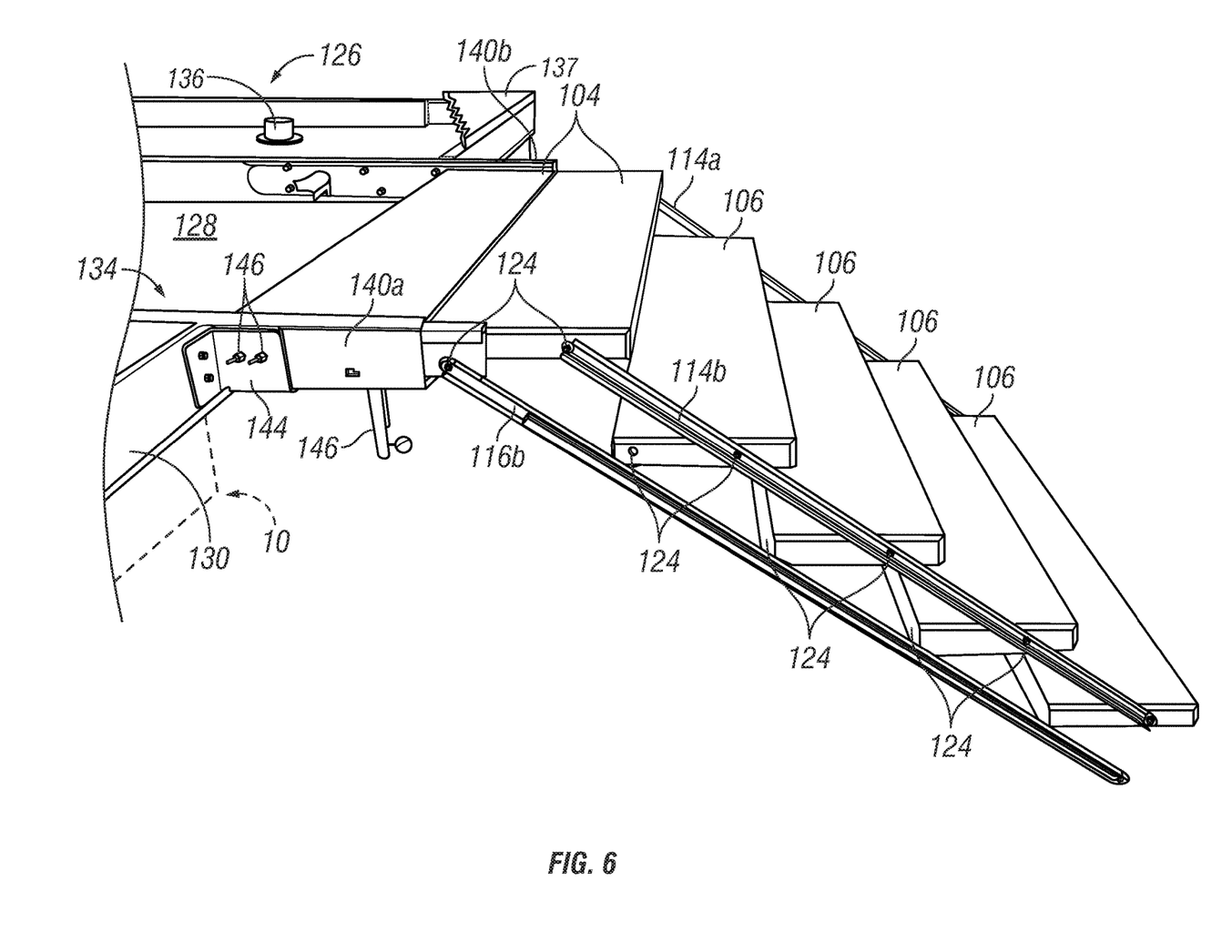
FIG. 6 is a left side, perspective view of the example retractable trailer stair assembly shown in FIG. 5 in a deployed position.
Figure 7:
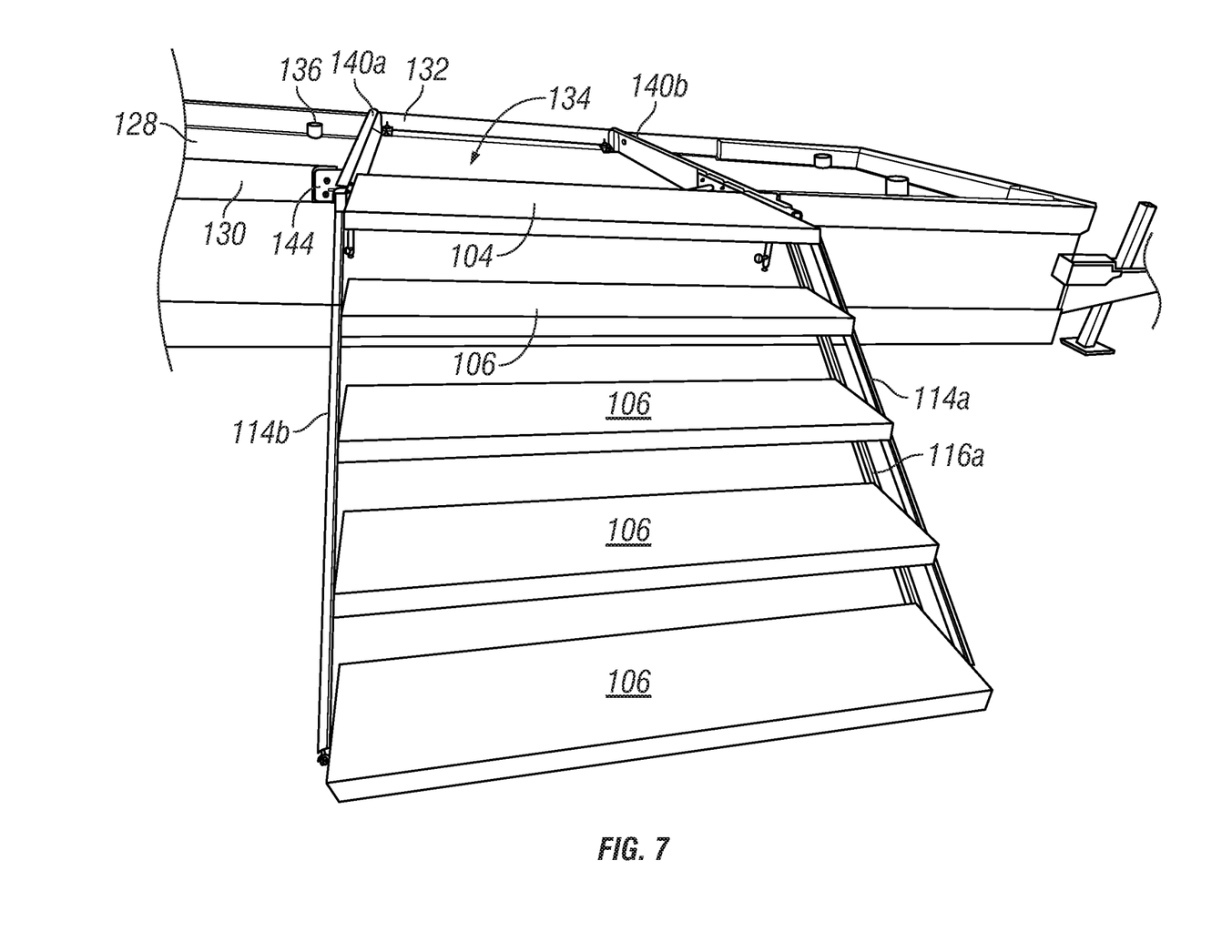
FIG. 7 is a front, perspective view of the example retractable trailer stair assembly shown in FIG. 5 in a deployed position.

FIGS. 5-7 show the retractable stair assembly 102 installed in a trailer frame 126 with the trailer body removed to reveal the positioning of the retractable stair assembly 102 within the trailer frame. In the embodiment shown, the trailer frame 126 includes a frame platform 128 that is a base platform extending the entire length of the trailer. The trailer frame 126 has a first structural beam 130 and a second structural beam 132 extending longitudinal along the sides of the frame platform 128. The beams 130, 132 define an internal cavity 134 there between above the frame platform 128. The retractable stair assembly 102 is installed in the internal cavity between the beams 130, 132. In addition to the retractable stair assembly 102, there are plumbing pipes and drains 136 extending into the internal cavity 134 in the embodiment shown. As shown, the breams 130, 132, and pipes and drains 136 extend between the platform 128 and a subfloor 137. The retractable stair assembly is dimensioned to fit between the platform 128 and subfloor 137. In some cases, that envelope between the platform 128 and subfloor 137 may be approximately 4 inches or 10.2 cm. By installing the retractable stair assembly 102 in the internal cavity 134, the retractable stair assembly 102 is protected from outside elements. As shown, the retractable stair assembly 102 longitudinally extends transversely between the beams 130, 132. In the embodiment shown, there is an opening 138 defined in beam 130 through which the retractable stair assembly 102 extends. A diagrammatical representation of the prior art retractable stair assembly 10 is shown in FIG. 6 to illustrate the position below the beam 130 where it is exposed to weather elements and vulnerable to damage; in contrast, the retractable stair assembly 102 is positioned above the platform 126 where it is not exposed to outside elements. Likewise, instead of being positioned below the beam 130 like the retractable stair assembly 10, the retractable stair assembly 102 extends through the beam 130.

As shown, the slide assembly 112 includes slide rails 140*a*, 140*b* on each side of the step platform 104 and steps 106. The slide rails 140*a*, 140*b* extend transversely between the beams 130, 132. In the embodiment shown, the slide rails 140*a* and 140*b* are attached to the beams 130, 132. As shown, a bracket 144 and fasteners 146 connect the slide rails 140*a*, 140*b* with the beams 130, 132. The step platform 104 and steps 106 are slidably coupled with the slide rails 140*a*, 140*b*, such as with rollers, bearings or other like mechanism. This allows the step platform 104 and steps 106 to slidably move along line 142 into and out of the trailer frame 126. In some embodiments, a lock 146 can be provided to lock the position of the retractable stair assembly 102 with respect to the trailer frame during transit of the trailer 100.

EXAMPLES

Illustrative examples of the trailer, retractable stair assembly, and method disclosed herein are provided below. An embodiment of the trailer, retractable stair assembly, and method may include any one or more, and any combination of, the examples described below.

Example 1 is a trailer with a retractable stair assembly. The trailer includes a trailer frame with a frame platform and at least one structural beam extending from the frame platform. The frame platform and the structural beam define an interior cavity. The trailer also includes a retractable stair assembly movable between a stowed position in which the retractable stair assembly is positioned within the interior cavity of the trailer frame and a deployed position in which the retractable stair assembly extends out of the trailer frame to establish a plurality of steps out of the trailer to an egress surface.

In Example 2, the subject matter of Example 1 is further configured such that in the stowed position, a longitudinal plane defined by the retractable stair assembly is substantially coplanar with a longitudinal plane defined by the structural beam.

In Example 3, the subject matter of Example 2 is further configured such that the structural beam defines an opening and the retractable stair assembly extends through the opening in the structural beam in the deployed position.

In Example 4, the subject matter of Example 3 is further configured such that a longitudinal axis of the retractable stair assembly is approximately perpendicular to a longitudinal axis of the structural beam.

In Example 5, the subject matter of Example 2 is further configured such that at least a portion of the retractable stair assembly is fixedly connected with the structural beam.

In Example 6, the subject matter of Example 1 is further configured such that the retractable stair assembly comprises a platform slideably connected with a slide assembly and the platform is slidable between the stowed position in which the platform is fully within the interior cavity of the trailer frame and the deployed position in which the platform at least partially extends out of the trailer frame.

In Example 7, the subject matter of Example 6 is further configured such that a longitudinal plane of the platform is substantially coplanar with a longitudinal plane of the slide assembly in the deployed position.

In Example 8, the subject matter of Example 7 is further configured such that the platform is movable between the stowed position and the deployed position substantially along a single plane.

In Example 9, the subject matter of Example 1 is further configured such that the frame platform includes an interior side not exposed to weather elements and an exterior side exposed to weather elements, wherein the retractable stair assembly extends from the interior side of the frame platform.

In Example 10, the subject matter of Example 9 is further configured to include a subfloor spaced apart from the interior side of the frame platform such that the interior cavity is defined between the subfloor and the frame platform, and the retractable stair assembly is disposed in the interior cavity between the subfloor and the frame platform in the stowed position.

In Example 11, the subject matter of Example 10 is further configured such that a longitudinal plane defined by the retractable stair assembly intersects with a longitudinal axis of a plumbing pipe or drain extending between the frame platform and the subfloor.

Example 12 is a retractable stair assembly for a trailer having an interior cavity defined by a trailer frame. The retractable stair assembly includes a slide assembly, a platform, and a plurality of steps. The platform is connected with the slide assembly such that the platform is slidably movable between a stowed position and a deployed position. The plurality of steps are operatively connected with the platform. The platform moves between the stowed position and the deployed position along a single plane.

In Example 13, the subject matter of Example 12 is further configured such that a longitudinal plane of the platform is substantially coplanar with a longitudinal plane of the slide assembly in the deployed position.

In Example 14, the subject matter of Example 13 is further configured such that at least a portion of the plurality of steps are pivotally connected with the platform.

In Example 15, the subject matter of Example 14 is further configured such that the plurality of steps are pivotal about the platform to a position coplanar with the longitudinal plane of the platform when the platform is in the stowed position.

In Example 16, the subject matter of Example 12 is further configured such that the slide assembly is mounted to the trailer frame within the interior cavity.

In Example 17, the subject matter of Example 16 is further configured such that the platform is configured to be received within the interior cavity of the trailer frame in the stowed position.

Example 18 is a method of moving a retractable trailer stair assembly between a stowed position and a deployed position. The method includes the steps of: (i) providing a retractable stair assembly in a stowed position in which the retractable stair assembly is disposed within an interior cavity of a trailer frame; (ii) moving the retractable stair assembly from the stowed position to a deployed position extending out of the trailer frame, wherein the retractable stair assembly includes a platform and a plurality of steps configured to define a set of steps out of a trailer to an egress surface in the deployed position. In some embodiments, the platform is linearly movable between the stowed position and the deployed position.

In Example 19, the subject matter of Example 18 is further configured such that the retractable stair assembly includes a slide assembly that is slidably connected with the platform such that a longitudinal plane of the platform is substantially coplanar with a longitudinal plane of the slide assembly in the deployed position.

In Example 20, the subject matter of Example 18 is further configured such that the platform is configured to move between the stowed position and the deployed position along a single plane.

Although the present disclosure has been described with reference to particular means, materials and embodiments, from the foregoing description, one skilled in the art can easily ascertain the essential characteristics of the invention and various changes and modifications may be made to adapt the various uses and characteristics without departing from the spirit and scope of the invention.

What is claimed is:

1. A trailer with a retractable stair assembly, the trailer comprising:
    a trailer frame including a frame platform and at least one structural beam extending along a longitudinal axis of the frame platform;
    a subfloor spaced apart from the frame platform, wherein an interior cavity is defined between the subfloor, the frame platform, and the at least one structural beam; and
    a retractable stair assembly movable between a stowed position in which the retractable stair assembly is positioned within the interior cavity between the subfloor and the frame platform not exposed to weather elements and a deployed position in which the retractable stair assembly extends laterally out of a side of the trailer frame through an opening in the at least one structural beam to establish a plurality of steps out of the trailer to an egress surface.

2. The trailer of claim 1, wherein in the stowed position, a longitudinal plane defined by the retractable stair assembly is substantially coplanar with a longitudinal plane defined by the structural beam.

3. The trailer of claim 1, wherein the structural beam is proximate a periphery of the frame platform.

4. The trailer of claim 1, wherein a longitudinal plane defined by the frame platform is approximately perpendicular to a longitudinal plane defined by the subfloor.

5. The trailer of claim 1, wherein at least a portion of the retractable stair assembly is fixedly connected with the at least one structural beam.

6. The trailer of claim 1, wherein the retractable stair assembly comprises a stair platform slideably connected with a slide assembly, wherein the stair platform is slidable between the stowed position in which the stair platform is fully within the interior cavity and the deployed position in which the stair platform at least partially extends out of the interior cavity.

7. The trailer of claim 6, wherein a longitudinal plane of the stair platform is substantially coplanar with a longitudinal plane of the slide assembly in the deployed position.

8. The trailer of claim 7, wherein the stair platform is movable between the stowed position and the deployed position substantially along a single plane.

9. The trailer of claim 6, further comprising a lock movable between a locked position and an unlocked position, wherein the lock in the locked position prevents the retractable stair assembly from moving to the deployed position.

10. The trailer of claim 9, wherein the lock in the locked position prevents the stair platform from moving with respect to the slide assembly.

11. The trailer of claim 1, wherein a longitudinal plane defined by the retractable stair assembly intersects with a longitudinal axis of a plumbing pipe or drain extending between the frame platform and the subfloor.

12. The trailer of claim 1, further comprising a door movable between (i) a closed position that blocks the retractable stair assembly from moving to the deployed position and (ii) an open position that allows the retractable stair assembly to move to the deployed position.

13. The trailer of claim 12, wherein the door is configured to protect the interior cavity from weather elements when the door is in the closed position.

14. The trailer of claim 13, further comprising one or more locks associated with the door, wherein the one or more locks are movable between a locked position that prevents the door from moving to the open position and an unlocked position that allows the door to move to the open position.

15. A retractable stair assembly for a trailer having an interior cavity defined by a subfloor of the trailer, a trailer frame platform, and at least one trailer frame structural beam, wherein the trailer frame structural beam extends along a longitudinal axis of the frame platform, wherein the subfloor of the trailer is spaced apart from the trailer frame platform, the retractable stair assembly comprising:
    a slide assembly;
    a stair platform connected with the slide assembly, wherein the stair platform is slidably movable between a stowed position and a deployed position, wherein at least a portion of the stair platform is configured to be received within the interior cavity of the trailer not exposed to weather elements in the stowed position, and wherein the platform is configured to extend laterally out of a side of the trailer through an opening in the structural beam in the deployed position; and
    a plurality of steps operatively connected with the stair platform.

16. The retractable stair assembly of claim 15, wherein a longitudinal plane of the platform is substantially coplanar with a longitudinal plane of the slide assembly in the deployed position.

17. The retractable stair assembly of claim 16, wherein at least a portion of the plurality of steps are pivotally connected with the platform.

18. The retractable stair assembly of claim 17, wherein the plurality of steps are pivotal about the platform to a position coplanar with the longitudinal plane of the platform when the platform is in the stowed position.

19. The retractable stair assembly of claim 15, wherein the slide assembly is mounted to the trailer frame at least partially within the interior cavity.

20. The retractable stair assembly of claim 15, further comprising a lock movable between (i) a locked position that prevents the stair platform from moving with respect to the slide assembly, and (ii) an unlocked position that allows the stair platform to move with respect to the slide assembly.

* * * * *